J. S. BROWN.
Horse Hay Fork.
No. 2,392. Reissued Nov. 6, 1866.
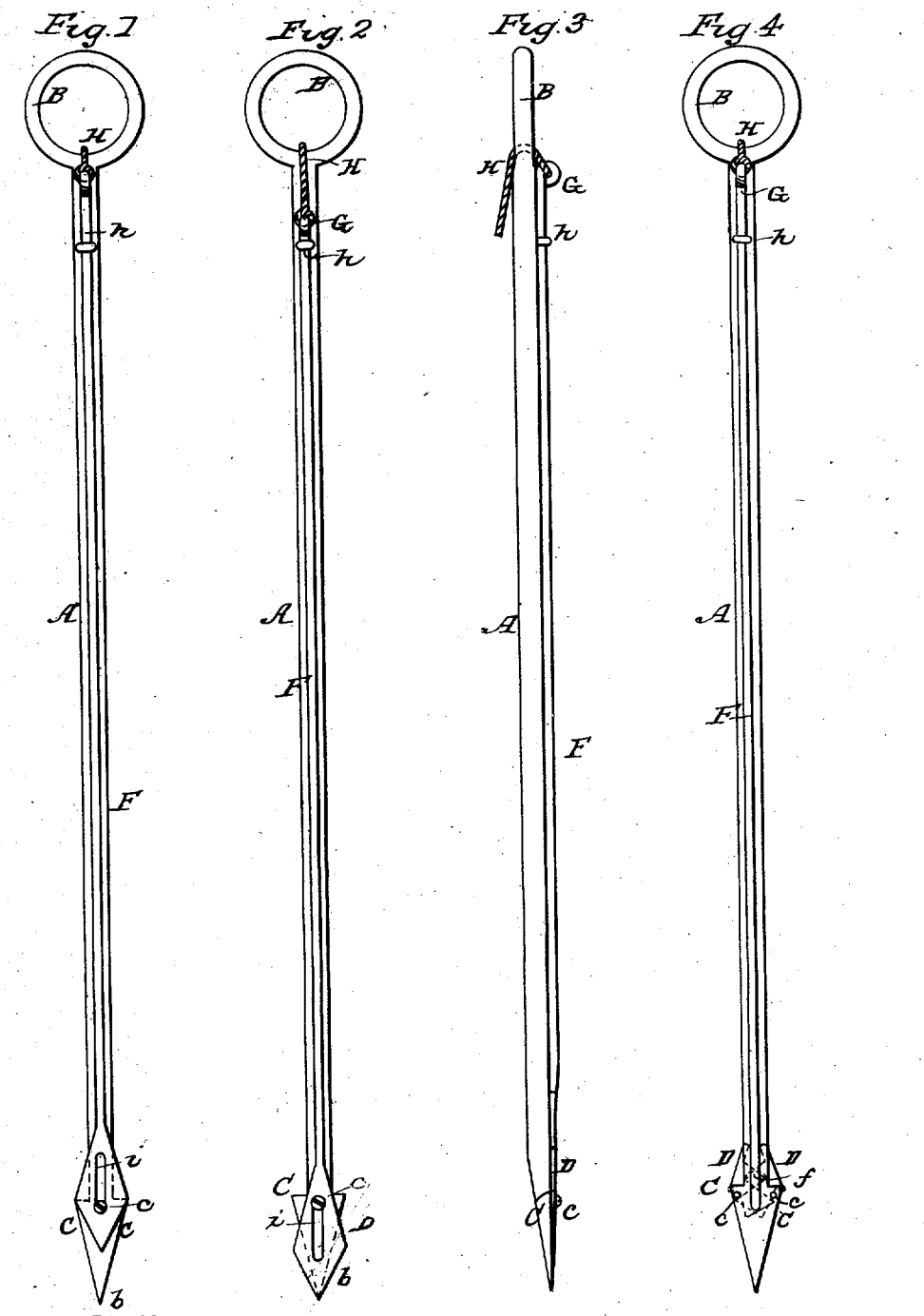
WITNESSES
Thos. J. Parker
Thos A. Connolly
INVENTOR
J. S. Brown
N. PETERS, Photo-Lithographer, Washington, D. C.

BEST AVAILABLE COPY

BEST AVAILABLE COPY

UNITED STATES PATENT OFFICE.

J. S. BROWN, OF WASHINGTON, DISTRICT OF COLUMBIA.

IMPROVEMENT IN HORSE HAY-FORKS.

Specification forming part of Letters Patent No. 56,359, dated July 17, 1866; Reissue No. 2,392, dated November 6, 1866.

DIVISION B.

*To all whom it may concern:*

Be it known that I, J. S. BROWN, of Washington, in the county of Washington and District of Columbia, have invented a new and Improved Hay-Elevator; and I do hereby declare that the following is a full and exact description thereof, reference being had to the accompanying drawings, making part of this specification—

Figure 1 being a side view of the instrument as arranged for piercing the hay, straw, or other fibrous material, and in position for tripping the load when elevated; Fig. 2, a side view of the same when its barbs or shoulders are uncovered, as in the act of raising the hay; Fig. 3, an edge view of the same, as in Fig. 1; Fig. 4, a side view of the instrument with its barbs or shoulders covered, representing some modifications of construction and operation.

Like letters designate corresponding parts in all of the figures.

The instrument has a shaft, A, of suitable length and size, pointed at the lower end, *b*, and having a ring or hook, B, at the upper end, by which it is attached to the rope whereby t is lifted. These are essential structural parts of the instrument. It is inserted into he hay by piercing with its point *b*, and pushng at the ring B with the hands or foot.

When once it is inserted into the hay it is ecessary to employ some means to cause it hold the hay and lift what is held. For his purpose I provide fixed barbs or shoulders C on two opposite sides of the shaft, (one ould less perfectly effect the purpose, and ore than two might be used,) a few inches ove the point *b*, abrupt or about at right gles to the shaft at the upper edges thereof, d sloping from their outer extremities to e point *b* of the shaft. The proportions of e parts may be about as shown in the drawgs.

When the hay has been elevated to the place sired, it is necessary to remove the hold of barbs C C from the hay. To effect this I ver them with bars D D, sloping or wedgeing in form or position, substantially as own in Fig. 1 or Fig. 4, or in an equivalent manner, so that the sloping or wedge position or form of the bars or bar, will allow the hay to slide off and become disengaged from the instrument.

When the instrument is again inserted into hay, and the act of lifting again commences, the bar or bars are drawn down by the act, so as at once to uncover the barbs or shoulders automatically.

In order to cover and uncover the barbs or shoulders, the bar or bars may have either of two motions—that is, either sliding or turning motion.

In Figs. 1, 2, and 3 the sliding motion is represented. The bar D (a single bar answering for both barbs) has a simple vertical sliding movement up and down on the shaft A, by a slot or slots, *i*, therein, and screws or pins *c* to hold the bar in place and guide and limit its action.

In Fig. 4 the bars D D (one for each barb) turn out and in on fixed pivots *c c*, to cover and uncover the barbs or shoulders. When pivoted bars are thus used the holes *d d* therein are made oblong, or in the form of slots, to enable the bars to shut down by each other, and allow the same rod or equivalent to enter them for moving the bars.

In order to actuate the bar or bars, a rod, F, or its equivalent, is employed, its lower end being attached to the bar or bars, as represented or otherwise, and its upper end terminating in a loop, G, for attaching a cord, H, which extends thence up through the ring B of the shaft, and then to the person who draws upon it to raise the bar or bars and trip the load. A staple or band, *h*, through which the rod F slides near its upper end, keeps the same in position.

The advantages and superiority of this instrument are: While it operates with great ease and perfection, it is very simple and cheap in construction, having few parts, requiring comparatively very little material, and being very easy to form and construct, and quite free from liability to break or get out of repair, for, as will be seen, there is no leverage of strain thrown upon any part, the hay acting simply by weight and compression upon it, and the act of moving the bar or bars D being directly and immediately thereto near the lower end of the instrument.

What I claim as my invention, and desire to secure by Letters Patent, is—

The employment of a movable bar or bars, D, to cover and uncover fixed barbs or shoulders C C, substantially as and for the purposes herein specified.

J. S. BROWN.

Witnesses:
EDM. F. BROWN,
THOS. T. PARKER.